UNITED STATES PATENT OFFICE.

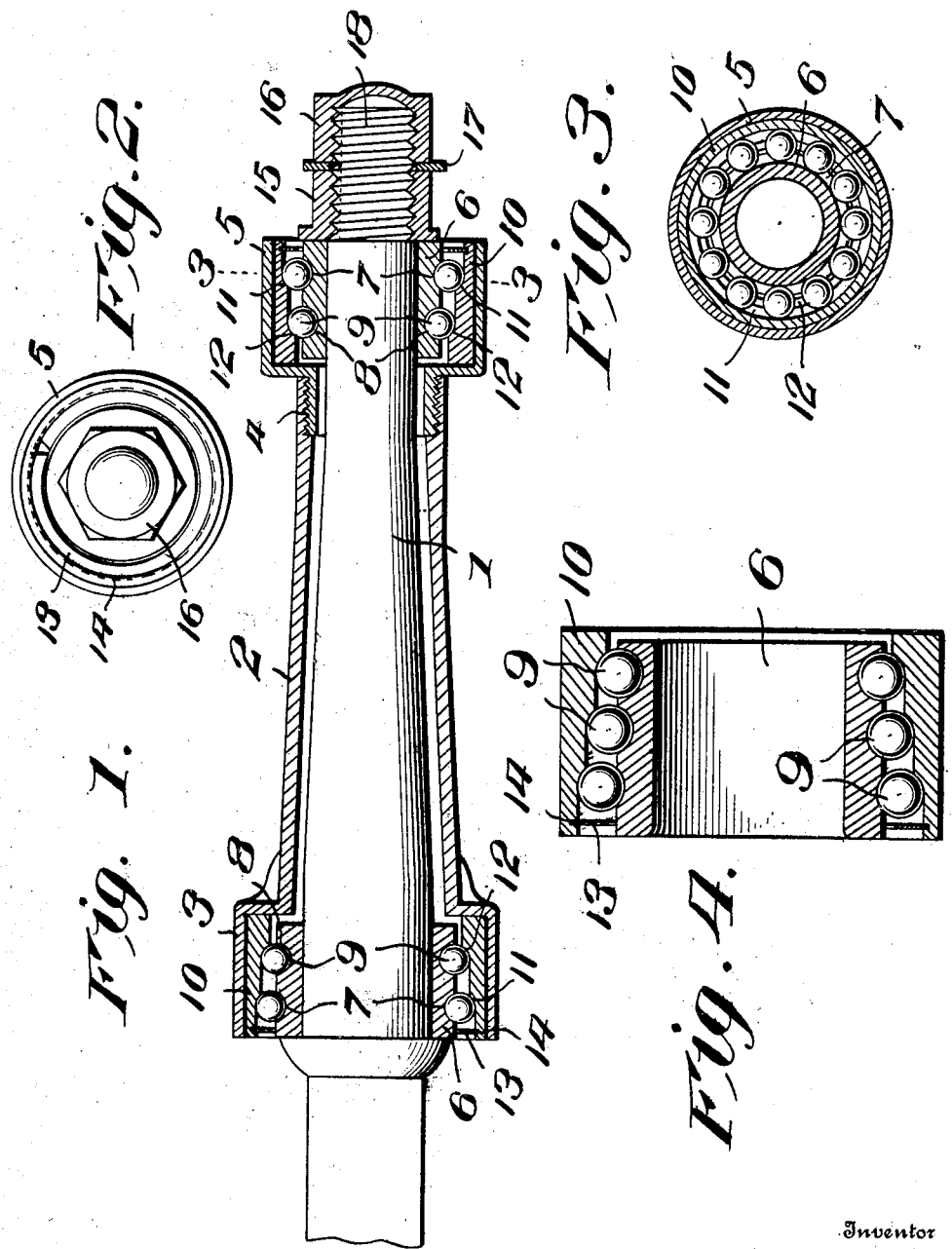

SCOTT R. COPPINS, OF PRINCETON, ILLINOIS, ASSIGNOR TO EVANS-COPPINS & STARKS COMPANY, OF PRINCETON, ILLINOIS.

BALL-BEARING.

No. 918,422.　　Specification of Letters Patent.　　Patented April 13, 1909.

Application filed November 24, 1906. Serial No. 344,807.

*To all whom it may concern:*

Be it known that I, SCOTT R. COPPINS, a citizen of the United States, residing at Princeton, in the county of Bureau and State of Illinois, have invented certain new and useful Improvements in Ball-Bearings; and I do hereby declare the following to be a full, clear, and exact description of the invention, such as will enable others skilled in the art to which it appertains to make and use the same.

My invention relates to new and useful improvements in ball bearings and more particularly to that class adapted to be used in connection with vehicle spindles and my object is to provide a device of this class which may be readily applied to any make of spindles, boxing and shafting.

A further object is to provide a device of this class which will consist of but few parts.

A still further object is to so construct the parts of the bearing that the balls will be prevented from moving toward the sides of the races and the wheel held against lateral movement.

A still further object is to provide a ring and cup that may be readily adjusted to compensate for wear.

Other objects and advantages will be hereinafter referred to and more particularly pointed out in the claim.

In the accompanying drawings which are made a part of this application, Figure 1 is a longitudinal sectional view through a boxing and bearings mounted therein, the same being shown as applied to use upon a spindle. Fig. 2 is an end elevation of a spindle showing my improved bearings mounted thereon. Fig. 3 is a transverse sectional view through one of the bearings, as seen from line 3—3 Fig. 1, and, Fig. 4 is a longitudinal sectional view through one of the bearings showing the same on an enlarged scale and employing a three point bearing.

Referring to the drawings in which similar reference numerals designate corresponding parts throughout the several views, 1 indicates a spindle which may be of the usual or any preferred form and particularly of that class used in connection with buggies or light vehicles around which is adapted to be disposed a boxing or female section 2, the inner end of the boxing being provided with an enlarged portion forming a housing 3. The opposite end of the boxing or female part 2 is adapted to receive a male part or collar 4 formed integral with a similar housing 5, the housing 5 being of less diameter than the housing 3 the female part being interiorly threaded to receive the threaded end of the male part 4. Disposed around the inner and outer ends of the spindle 1 and within the housings 3 and 5 are my improved form of bearings comprising rings 6, each of said rings being provided with circular races 7 and 8 in which are disposed a plurality of bearing balls 9. The races 8 around the rings 6 are of greater depth than the races 7 so that the balls 9 within the races 8 will run on a path of less diameter than will the balls in the races 7. In order to hold the balls within their respective races and to provide a bearing surface therefor, I have provided cups 10 which are stepped or provided with gradations on their inner surfaces to form shoulders or bearing points 11 and 12 which are adapted to engage the bearing balls 9 and hold the same within their respective races.

By disposing the inner tier of bearing balls lower than the outer tier and stepping or gradating the cups as shown, it will be seen that the cups can be readily introduced over the rings and balls contained thereon. As soon as the bearing points upon the cups have been directed into engagement with the balls in the races, the cups are secured in position thereover by disposing a split ring or the like 13 within a channel 14 formed in one end of the cups 10 thereby securely locking the cups around the rings and into engagement with the bearing balls carried thereby. The cups 10 are so constructed that they snugly fit within the housings 3 and 5 respectively, while the rings 6 are provided with openings so that they snugly fit upon their respective ends of the spindle so that when the wheel is rotated the rings will remain stationary upon the spindle and the cups stationary within their respective housings, thereby directing all of the friction upon the bearing balls and it will be readily seen that it will be impossible for the wheel hub to have lateral movement from the fact that the bearing points upon one cup are oppositely disposed and opposed to the bearing points upon the other cup.

The bearings are adjusted and held in their adjusted position upon the spindle by means of nuts 15 and 16 and a locking washer 17, the nut 15 being first disposed upon the threaded end 18 of the spindle after which the locking washer 17 is disposed in position around the threaded end 18 and against the outer face of the nut 15 when the nut 16 is turned upon the threaded end 18 and the locking washer secured between the two nuts. The nut 15 may also be employed for taking up the wear of the rings and cups as it will be seen that by directing the nut against the end of the outer ring 6 said ring may be pushed longitudinally on the spindle which will result in directing the boxing inwardly and disposing the bearing points of the two cups against the balls.

In Fig. 1 of the drawing I have shown the bearings as employing but two races while in Fig. 4 of the drawing I have shown the bearings provided with three races and it will be readily understood that by increasing the length of the rings and cups one or more races may be provided for, thereby enabling me to construct a bearing of the proper dimensions to be used in connection with various sizes of vehicles. In constructing the bearings in this manner, it will be seen that the same can be constructed in sets and readily applied to the hub of the wheel even by those not skilled in the art.

What I claim is:

The combination of an axle, a boxing receiving said axle and having a bore of such diameter as to provide an annular space therebetween and said axle for rotation out of contact therewith, said boxing having an annular enlargement at one end forming a housing, a like housing arranged at the opposite end of said boxing and having screw-threaded connection therewith and otherwise being a structural counterpart of the first-referred to housing or enlargement, ring-members snugly encompassing said axle, within said housings, and stationary thereon, said ring-members having series of annular perimetric grooves, cups of greater diameter than, and encircling said rings, within said housings, and provided with internal annular-stepped surfaces opposed to the grooves of said rings, balls bearing in said grooves and against the shoulders formed by said stepped surfaces, and split rings interposed between the aforesaid rings and said cups, with one edge of each split-ring received by a groove in each cup, near one edge thereof.

In testimony whereof I have signed my name to this specification in the presence of two subscribing witnesses.

SCOTT R. COPPINS.

Witnesses:
H. C. GILL,
JOHN A. ROSEN.